United States Patent
Bowyer et al.

(10) Patent No.: US 9,732,858 B2
(45) Date of Patent: Aug. 15, 2017

(54) SELF-CENTERING METAL-TO-METAL SEALS FOR USE WITH VALVES

(71) Applicant: Emerson Process Management Regulator Technologies Tulsa, LLC, Tulsa, OK (US)

(72) Inventors: Johnny Bowyer, Tulsa, OK (US); Travis Ellison, Tulsa, OK (US); James Myers, Tulsa, OK (US)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 0 days.

(21) Appl. No.: 15/056,476

(22) Filed: Feb. 29, 2016

(65) Prior Publication Data

US 2017/0059043 A1 Mar. 2, 2017

Related U.S. Application Data

(60) Provisional application No. 62/210,665, filed on Aug. 27, 2015.

(51) Int. Cl.
| | |
|---|---|
| *F16K 1/42* | (2006.01) |
| *F16K 1/46* | (2006.01) |
| *F16K 1/34* | (2006.01) |
| *F16K 1/36* | (2006.01) |

(52) U.S. Cl.
CPC ............... *F16K 1/465* (2013.01); *F16K 1/34* (2013.01); *F16K 1/36* (2013.01); *F16K 1/42* (2013.01)

(58) Field of Classification Search
CPC ... F16K 1/465; F16K 1/36; F16K 1/34; F16K 1/42
USPC ................... 251/84–86, 318, 333, 359–360
See application file for complete search history.

(56) References Cited

U.S. PATENT DOCUMENTS

| | | | | |
|---|---|---|---|---|
| 1,686,849 A | * | 10/1928 | Frauenheim | F16K 1/36 251/333 |
| 1,748,169 A | * | 2/1930 | Campbell | F16K 15/06 251/333 |
| 2,131,928 A | * | 10/1938 | Abegg | F04B 53/102 251/333 |

(Continued)

FOREIGN PATENT DOCUMENTS

WO  WO 2013085046 A1 *  6/2013

OTHER PUBLICATIONS

International Searching Authority, "International Search Report," issued in connection with International Patent Application No. PCT/US2016/048962, mailed Dec. 1, 2016, 5 pages.

(Continued)

*Primary Examiner* — John Bastianelli

(74) *Attorney, Agent, or Firm* — Hanley, Flight & Zimmerman, LLC

(57) ABSTRACT

An example apparatus includes a disc-shaped valve plug having a first metallic sealing surface extending circumferentially about a peripheral edge of the valve plug. The first metallic sealing surface has a first curved profile. The example apparatus further includes a valve seat defining an orifice and having a second metallic sealing surface having a second curved profile that is complementary to the first curved profile so that the first and second metallic sealing surfaces form a metal-to-metal seal when the first and second metallic sealing surfaces are in contact.

21 Claims, 11 Drawing Sheets

(56) References Cited

U.S. PATENT DOCUMENTS

| | | | | |
|---|---|---|---|---|
| 2,413,869 | A | * | 1/1947 | Hamer ............... F16K 15/06 |
| | | | | 251/359 |
| 2,786,485 | A | * | 3/1957 | Steirly ............ F04B 53/1027 |
| | | | | 251/333 |
| 3,550,903 | A | * | 12/1970 | Hugo .................. F16K 31/44 |
| | | | | 251/333 |
| 3,857,542 | A | * | 12/1974 | Heymann ........ F01D 17/145 |
| | | | | 137/625.33 |
| 4,262,698 | A | | 4/1981 | Fields |
| 4,392,632 | A | * | 7/1983 | Gast ................. F16K 31/082 |
| | | | | 251/333 |
| 7,540,470 | B1 | | 6/2009 | Blume |
| 2004/0051072 | A1 | * | 3/2004 | Hardin ................ F16K 1/34 |
| | | | | 251/333 |
| 2014/0284509 | A1 | | 9/2014 | Shindo |

OTHER PUBLICATIONS

International Searching Authority, "Written Opinion," issued in connection with International Patent Application No. PCT/US2016/048962, mailed Dec. 1, 2016, 5 pages.

Varec Biogas, "430 Series Thermal Operated Shut-Off Valve," 2015, (2 pages).

Shand & Jurs, "97130 Thermal Valve," (3 pages).

Groth Corporation, "Smart Relief . . . Safe Solutions," Wastewater Biogas Catalog, 2014, (82 pages).

Groth Corporation, "Installation, Operation and Maintenance Groth Model 8500 Thermal Valve and Flame Trap Assembly," Nov. 1994, (1 Page).

\* cited by examiner

SECTION A-A

SECTION A-A

SELF-CENTERING METAL-TO-METAL SEALS FOR USE WITH VALVES

CROSS REFERENCE TO RELATED APPLICATIONS

This patent claims the benefit of U.S. Provisional Application Ser. No. 62/210,665, titled "Self-Centering Metal-To-Metal Seals For Use With Valves," filed Aug. 27, 2015, which is incorporated herein by reference in its entirety.

FIELD OF THE DISCLOSURE

This disclosure relates generally to metal-to-metal seals and, more particularly, to self-centering metal-to-metal seals for use with valves.

BACKGROUND

Certain valve applications may require the mating of metallic sealing surfaces between a valve plug and a valve seat. For example, the mating of an elastomeric sealing surface to a metallic sealing surface, or to another elastomeric sealing surface, may not be suitable for valve applications that experience high temperatures and/or flames, such as may be experienced in a thermal valve.

Current metal-to-metal seals implement a knife edge and disc type geometry in relation to the valve plug and the valve seat. This geometry often demonstrates a minimal sealing surface area that requires extensive polishing to provide an adequate metal-to-metal seal between the valve plug and the valve seat. This geometry is also susceptible to leakage due to scarring of the minimal sealing surface area.

SUMMARY

An example apparatus for use with a valve includes a disc-shaped valve plug having a first metallic sealing surface extending circumferentially about a peripheral edge of the valve plug. The first metallic sealing surface has a first curved profile. The example apparatus further includes a valve seat defining an orifice and having a second metallic sealing surface having a second curved profile that is complementary to the first curved profile so that the first and second metallic sealing surfaces form a seal when the first and second metallic sealing surfaces are in contact.

DETAILED DESCRIPTION

Figure 1:
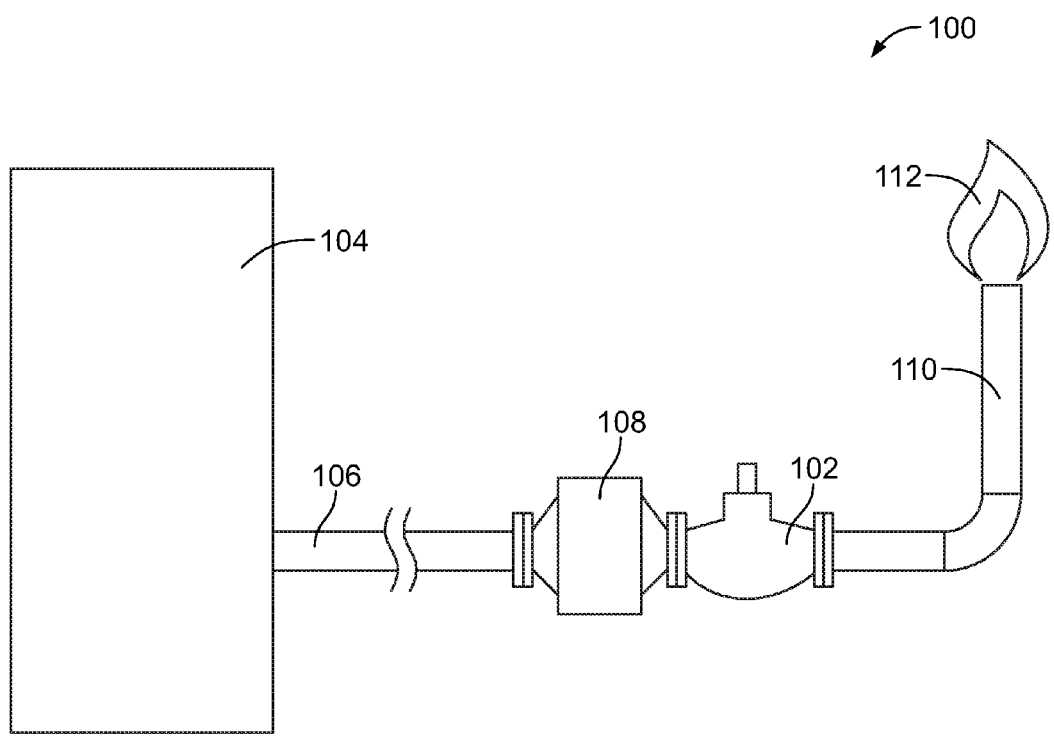
FIG. 1 illustrates a system in which a valve having a metal-to-metal seal between a valve plug and a valve seat may be used.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

The example apparatus described herein provides a self-centering metal-to-metal seal for use in valve applications. Unlike current metal-to-metal seals that implement a knife edge and disc type geometry in relation to the valve plug and the valve seat, the example apparatus described herein includes a valve plug and a valve seat having respective metallic sealing surfaces including complementary curved profiles. The complementary curved profiles increase the surface area of the resultant metal-to-metal seal and provide for a metal-to-metal seal that is self-centering. The increased surface area of the disclosed metal-to-metal seal requires less polishing relative to known metal-to-metal seal geometries, and the self-centering function of the disclosed metal-to-metal seal reduces the need for robust guidance structures between the valve plug and the valve seat.

In some disclosed examples, the apparatus includes a disc-shaped valve plug having a first metallic sealing surface extending circumferentially about a peripheral edge of the valve plug. In such disclosed examples, the first metallic sealing surface has a first curved profile. In such disclosed examples, the apparatus further includes a valve seat defining an orifice and having a second metallic sealing surface having a second curved profile that is complementary to the first curved profile so that the first and second metallic sealing surfaces form a seal when the first and second metallic sealing surfaces are in contact.

In some disclosed examples, the first and second curved profiles of the first and second metallic sealing surfaces have radii of curvature that match and/or are substantially the same. In some disclosed examples, the first and second curved profiles of the first and second sealing surfaces are parabolic in shape. In some disclosed examples, the first curved profile of the first metallic sealing surface has a concave shape, and the second curved profile of the second metallic sealing surface has a convex shape.

In some disclosed examples, the valve plug includes a first surface and a second surface opposite the first surface, with the peripheral edge of the valve plug being between the first and second surfaces of the valve plug. In some disclosed examples, the first metallic sealing surface is adjacent the second surface of the valve plug. In some disclosed examples, the first metallic sealing surface is adjacent the peripheral edge of the valve plug.

In some disclosed examples, the valve seat includes a first annular surface and a second annular surface opposite the first annular surface, and an inner surface between the first and second annular surfaces of the valve seat. In some disclosed examples, the second metallic sealing surface is adjacent the first surface of the valve seat. In some disclosed examples, the second metallic sealing surface is adjacent the inner surface of the valve seat.

In some disclosed examples, the valve plug has a first central axis defined by the peripheral edge of the valve plug, the valve seat has a second central axis defined by the inner surface of the valve seat, and the first and second metallic sealing surfaces align the first central axis with the second central axis when the first and second metallic sealing surfaces are in contact. In some disclosed examples, the first and second metallic sealing surfaces are magnetically coupled when the first and second metallic sealing surfaces are in contact.

FIG. 1 illustrates a system 100 in which a valve having a metal-to-metal seal between a valve plug and a valve seat may be used. In the system 100 of FIG. 1, the valve is a thermal valve 102. In operation, fluid (e.g., vapor) flows from a storage tank 104 through a first conduit 106 to an arrestor 108. The fluid flows through the arrestor 108, through the thermal valve 102, and through a second conduit 110 to the atmosphere. A flare 112 burns off excess vapor associated with the fluid.

In the illustrated system 100 of FIG. 1, a flame associated with the flare 112 may attempt to travel back through the second and first conduits 110, 106 toward and/or into the storage tank 104. The arrestor 108 is designed to prevent the propagation of the flame toward the storage tank 104. However, if a stabilized flame forms in the arrestor 108 and goes undetected, the arrestor 108 may overheat and allow the flame to pass through to the storage tank 104. However, in the illustrated system 100, the thermal valve 102 prevents the arrestor 108 from overheating. The thermal valve 102 is designed to sense the stabilized flame and to close and/or shut (e.g., to seal off the continued flow of the fluid to the atmosphere), thereby extinguishing the flame and eliminating the risk of the arrestor 108 overheating. The thermal valve 102 may include a metallic valve plug (not shown) and a metallic valve seat (not shown) that provide a metal-to-metal seal when the thermal valve 102 is in a closed and/or shut position such as, for example, when the valve plug and the valve seat are in contact.

Figure 2:
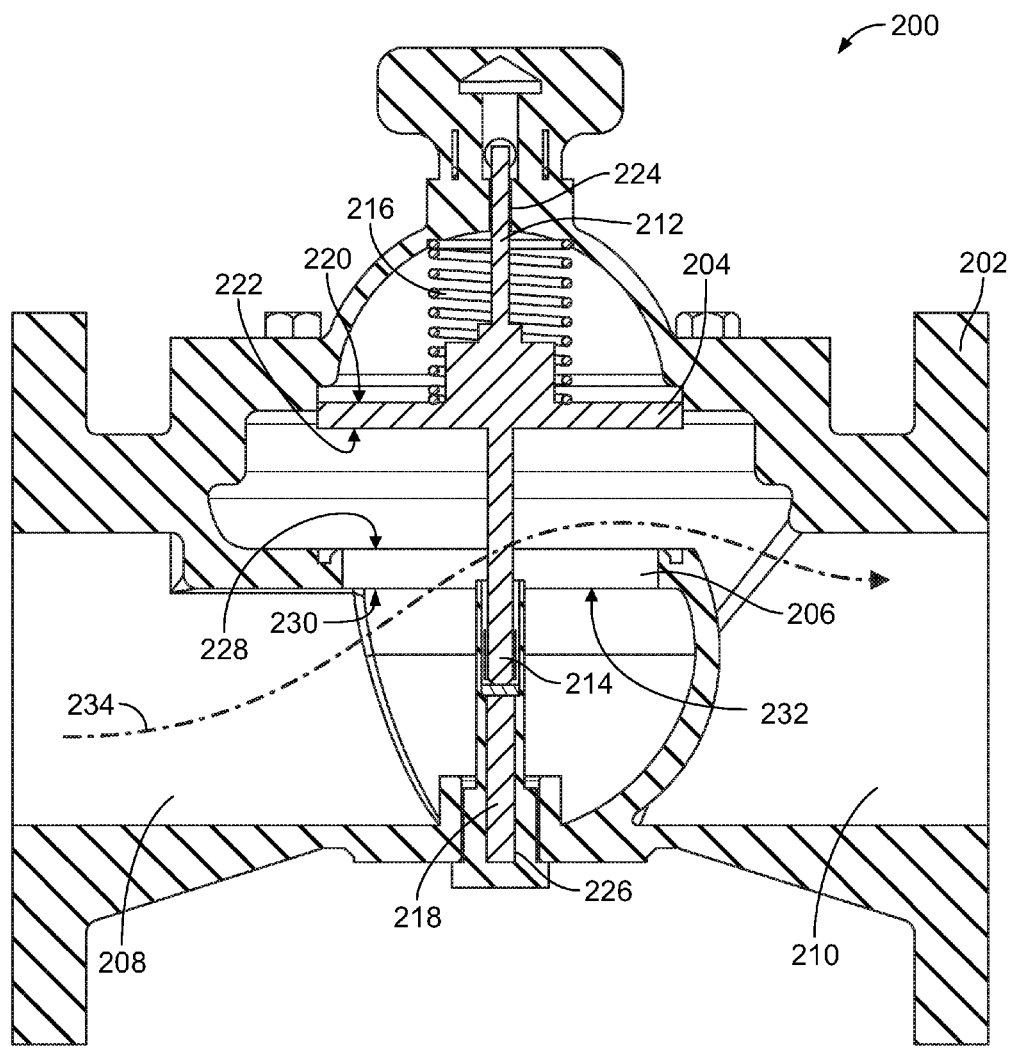
FIG. 2 is a partial cutaway view of a known valve in an open configuration.
Figure 3:
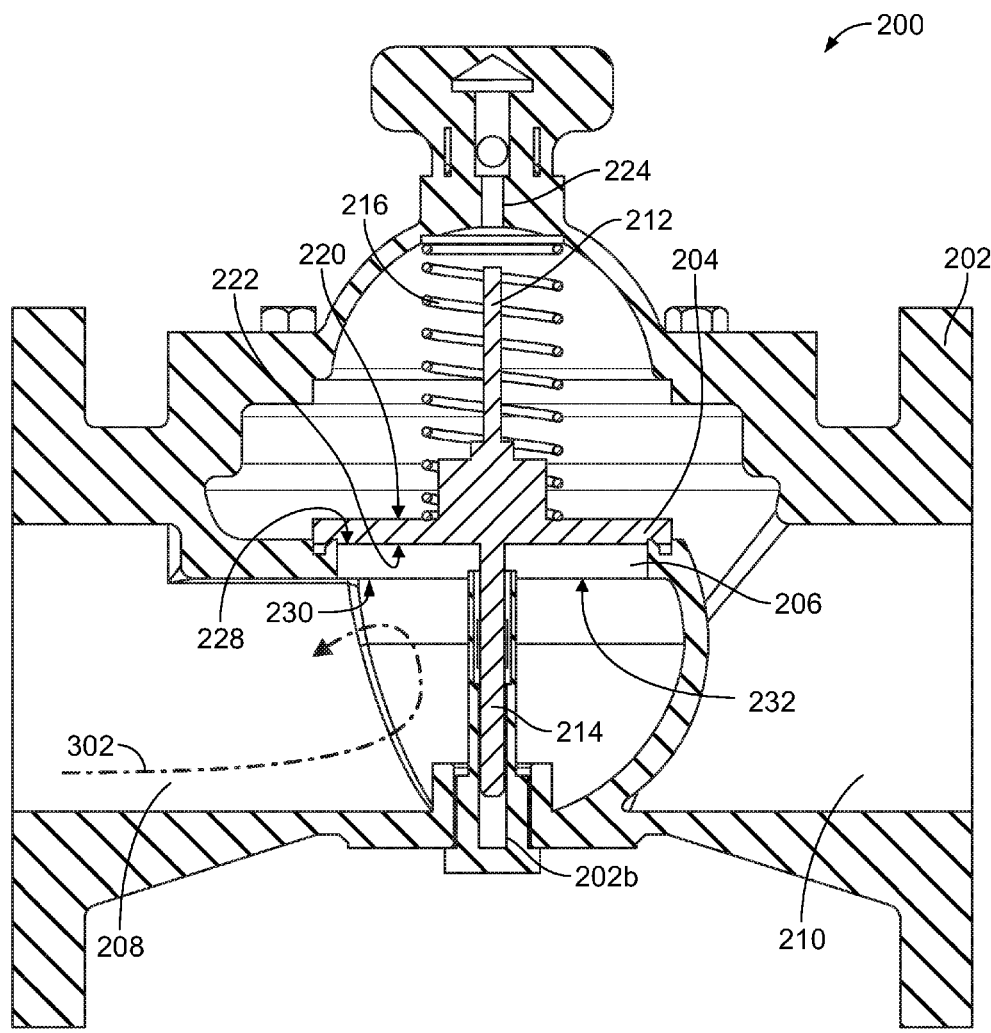
FIG. 3 is a partial cutaway view of the known valve of FIG. 2 in a closed configuration.

Before describing the details of the example valve having a valve plug and a valve seat including respective metallic sealing surfaces having complementary curved profiles, a description of a known valve 200 is provided in connection with FIGS. 2 and 3.

FIG. 2 is a partial cutaway view of the known valve 200 in an open configuration. The valve 200 includes a valve body 202, a valve plug 204, a valve seat 206, a fluid inlet 208, a fluid outlet 210, a first stem 212, a second stem 214, a closing spring 216, and a fusible element 218. The valve plug 204 has a disc-shaped configuration, including a first surface 220 and a second surface 222 opposite the first surface 220. The first stem 212 is integral with and/or rigidly coupled to the first surface 220 of the valve plug 204 and positioned in a first bore 224 of the valve body 202. The second stem 214 is integral with and/or rigidly coupled to the second surface 222 of the valve plug 204 and positioned in a second bore 226 of the valve body 202.

The valve seat 206 has a cylindrical configuration, including a first annular surface 228, a second annular surface 230 opposite the first annular surface 228, and an inner surface (not shown) between the first and second annular surfaces 228, 230. The first annular surface 228, second annular surface 230 and inner surface of the valve seat 206 collectively define an orifice 232. The valve seat 206 is rigidly coupled (e.g., via a press fit) to the valve body 202 at a position within the valve body 202 such that the valve plug 204 does not contact the valve seat 206 when the valve 200 is in an open configuration, as shown in FIG. 2. When the valve 200 is in an open configuration, a fluid may flow from the fluid inlet 208 toward the valve seat 206, through the orifice 232 defined by the valve seat 206 toward the fluid outlet 210, as is generally shown by the illustrated pathway 234.

The closing spring 216 applies a force against the first surface 220 of the valve plug 204, thereby biasing the valve plug 204 toward the valve seat 206. More specifically, the closing spring 216 biases the second surface 222 of the valve plug 204 toward the first annular surface 228 of the valve seat 206. The fusible element 218 shown in FIG. 2 is positioned within the second bore 226 of the valve body 202 and is in contact with the second stem 214 commonly positioned therein. The fusible element 218 is configured to be of a shape, rigidity and/or hardness so as not to be deformed in response to the force applied by the closing spring 216 on the valve plug 204 and transmitted to the fusible element 218 via the second stem 214. Thus, under normal operating conditions, the fusible element 218 maintains the valve plug 204 in an open and/or spaced apart position relative to the valve seat 206.

FIG. 3 is a partial cutaway view of the known valve of FIG. 2 in a closed configuration. In FIG. 3, the fusible element 218 (or a substantial portion thereof) that appeared in FIG. 2 has melted away and/or been burned off as a result of exposure to of a high temperature (e.g., that which would be caused by a flame) within the valve body 202 of the valve 200. In the absence of the fusible element 218, the force applied by the closing spring 216 against the first surface 220 of the valve plug 204 causes the valve plug 204 to come into contact with the valve seat 206. More specifically, the closing spring 216 causes a portion of the second surface 222 of the valve plug 204 to come into contact with a portion of the first annular surface 228 of the valve seat 206, thereby resulting in a metal-to-metal seal between the second surface 222 of the valve plug 204 and the first annular surface 228 of the valve seat 206.

As shown in FIGS. 2 and 3, the respective geometries of the second surface 222 of the valve plug 204 and the first annular surface 228 of the valve seat 206 are flat and/or planar (e.g., not curved). When the valve 200 is in a closed configuration as described above in connection with FIG. 3, the metal-to-metal seal that exists between the second surface 222 of the valve plug 204 and the first annular surface 228 of the valve seat 206 is intended to prevent a fluid from traveling along the pathway 234 shown in FIG. 2, and to instead restrict the fluid to a location between the fluid inlet 208 and the valve seat 206, as is generally shown in FIG. 3 by the illustrated pathway 302. The adequacy of the illustrated metal-to-metal seal depends on the contacting portions of the second surface 222 of the valve plug 204 and the first annular surface 228 of the valve seat 206 being sufficiently flat and planar relative to one another, and further depends on the lateral alignment of the valve plug 204 relative to the valve seat 206 as provided for by the first and second stems 212, 214 positioned within the first and second bores 224, 226 of the valve body 202.

In contrast to the known valve 200 described above in connection with FIGS. 2 and 3, the example valve 400 of FIGS. 4-7 includes an example valve plug 402 and an example valve seat 404 having respective example metallic sealing surfaces 406, 408 with complementary curved profiles. Although the example valve 400 of FIGS. 4-7 is described below in the context of a thermal valve application, the example valve plug 402 and the example valve seat 404 of the example valve 400 may be implemented in any valve application requiring a metal-to-metal seal.

Figure 4:
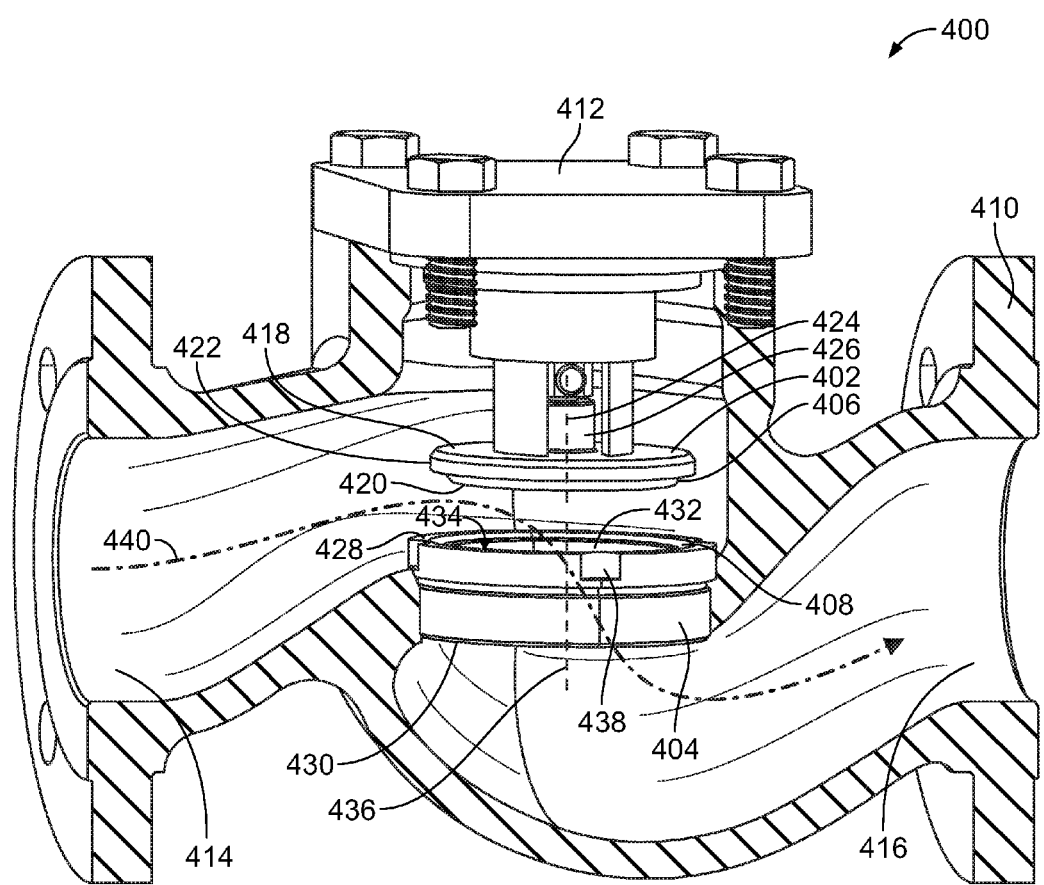
FIG. 4 is a partial cutaway view of an example valve having an example valve plug and an example valve seat including respective example metallic sealing surfaces having example complementary curved profiles. The example valve of FIG. 4 is in an open configuration.
Figure 5:
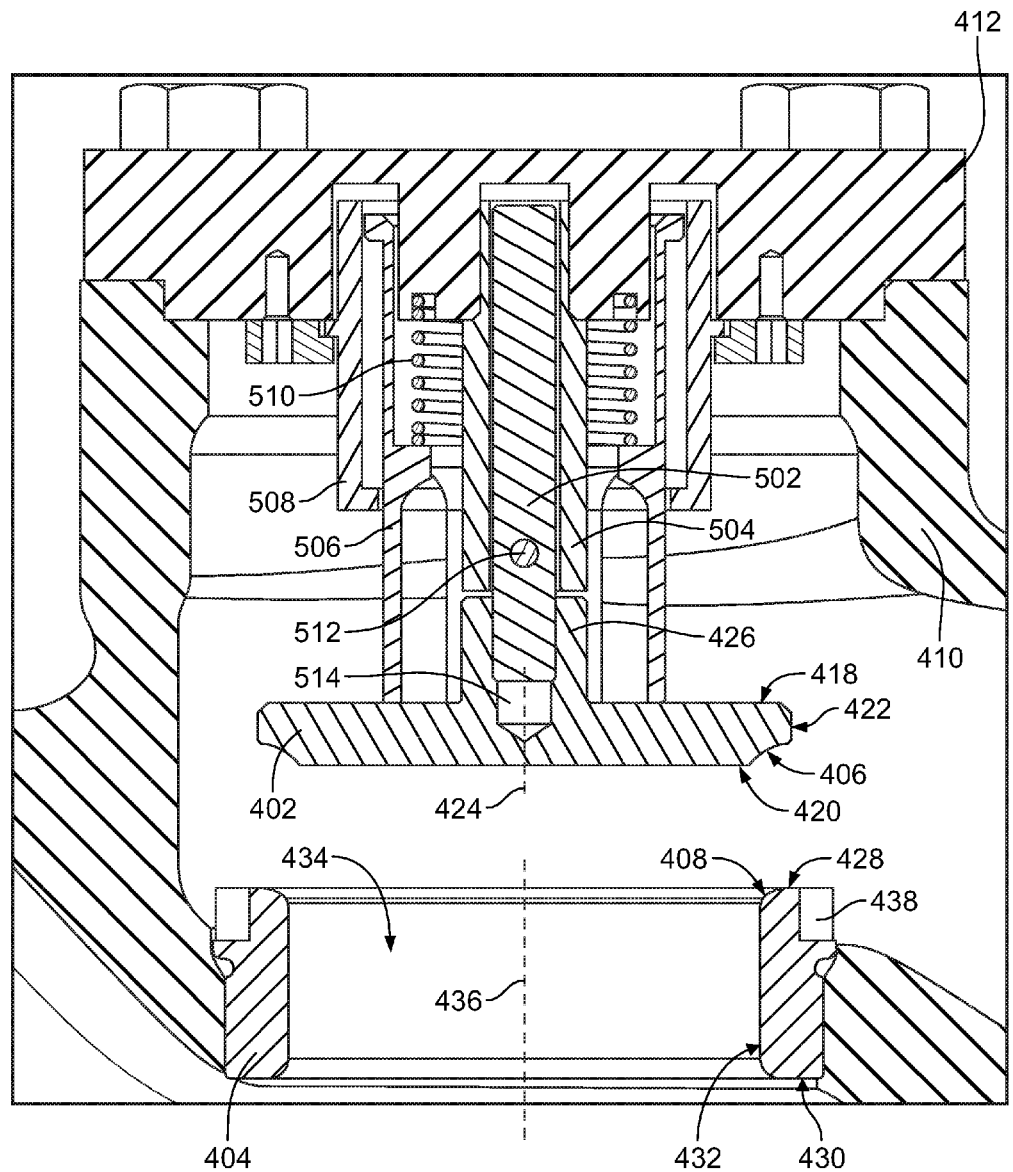
FIG. 5 is another partial cutaway view of the example valve of FIG. 4 in an open configuration.

Referring to FIGS. 4-5, the example valve 400 is shown in an open configuration. The valve 400 includes the valve plug 402, the valve seat 404, an example valve body 410, an example bonnet 412, an example fluid inlet 414, an example fluid outlet 416, an example stem 502, an example stem guide 504, an example spring seat 506, an example spring seat guide 508, an example closing spring 510, and an example fusible link 512.

In the illustrated example, the valve plug 402 has a disc-shaped configuration defined by an example first surface 418, an example second surface 420 opposite the first surface 418, and an example peripheral edge 422 located between the first and second surfaces 418, 420. In the illustrated example, the peripheral edge 422 of the valve plug 402 forms a circular profile that defines an example first central axis 424 of the valve plug 402. Although the illustrated valve plug 402 has a circular profile, the profile of the valve plug 402 may alternatively take the form of other shapes and/or configurations including, for example, an oval, an ellipse, and/or any type of polygon (e.g., a triangle, rectangle, square, rhombus, pentagon, hexagon, octagon, etc.).

In the illustrated example, the first metallic sealing surface 406 of the valve plug 402 extends circumferentially about the peripheral edge 422 of the valve plug 402. In the illustrated example, the first metallic sealing surface 406 is adjacent the second surface 420 of the valve plug 402. In the illustrated example, the first metallic sealing surface 406 is also adjacent the peripheral edge 422 of the valve plug 402. In some examples, the first metallic sealing surface 406 of the valve plug 402 has magnetic properties. In the illustrated example, the first metallic sealing surface 406 of the example valve plug 402 has an example first curved profile, which may be a concave parabolic shape. The first curved profile of the first metallic sealing surface 406 may alternatively take the form of other curved shapes, configurations, and/or orientations including, for example, a circular, convex, and/or s-shaped configuration.

In the illustrated example, the valve plug 402 also includes an example hub 426 located along the first surface 418 of the valve plug 402. The hub 426 contains a bore 514 that is configured to couple the valve plug 402 to the stem 502 via, for example, a threaded connection. The valve plug 402 may also include bores (not shown) through which the valve plug 402 may be coupled via suitable fasteners (e.g., bolts or screws) to the spring seat 506.

In the illustrated example, the valve seat 404 has a cylindrical configuration, including an example first annular surface 428, an example second annular surface 430 opposite the first annular surface 428, and an example inner surface 432 located between the first and second annular surfaces 428, 430. The first annular surface 428, the second annular surface 430 and the inner surface 432 of the valve seat 404 collectively define an example orifice 434. In the illustrated example, the inner surface 432 of the valve seat 404 forms a circular profile that defines an example second central axis 436 of the valve seat 404. Although the illustrated valve seat 404 has a circular profile, the profile of the valve seat 404 may alternatively take the form of other shapes and/or configurations including, for example, an oval, an ellipse, and/or any type of polygon (e.g., a triangle, rectangle, square, rhombus, pentagon, hexagon, octagon, etc.).

In the illustrated example, the second metallic sealing surface 408 of the valve seat 404 extends circumferentially about the inner surface 432 of the valve seat 404. In the illustrated example, the second metallic sealing surface 408 is adjacent the first annular surface 428 of the valve seat 404. In the illustrated example, the second metallic sealing surface 408 is also adjacent the inner surface 432 of the valve seat 404. In some examples, the second metallic sealing surface 408 of the valve plug 404 has magnetic properties, such that the first metallic sealing surface 406 of the valve plug 402 (which may also have magnetic properties) and the second metallic sealing surface 408 of the valve seat 404 are magnetically coupled when the first and second metallic sealing surfaces 406, 408 are in contact.

In the illustrated example, the second metallic sealing surface 408 of the valve seat 404 has an example second curved profile. In the illustrated example, the second curved profile of the second metallic sealing surface 408 is complementary to (e.g., having a radius of curvature that matches and/or is substantially the same as that of) the first curved profile of the first metallic sealing surface 406. In the illustrated example, the second curved profile has a convex parabolic shape. The second curved profile of the second metallic sealing surface 408 may alternatively take the form of any other curved shape, configuration, and/or orientation including, for example, a circular, concave, and/or s-shaped configuration having a curved profile that is complementary to the first curved profile of the first metallic sealing surface 406.

In the illustrated example, the valve seat 404 is rigidly coupled (e.g., via a press fit) to the valve body 410 at a position within the valve body 410 such that the valve plug 402 does not contact the valve seat 404 when the valve 400 is in an open configuration, as shown in FIGS. 4-5. In the illustrated example, the valve seat 404 includes example recesses 438 located along the first annular surface 428 of the valve seat 404 that may be used to facilitate the installation of the valve seat 404 within the valve body 410. When the valve 400 is in an open configuration, a fluid may flow from the fluid inlet 414 toward the valve seat 404, through the orifice 434 defined by the valve seat 404 toward the fluid outlet 416, as is generally shown in FIG. 4 by the illustrated pathway 440.

In the illustrated example, the valve plug 402 is rigidly coupled to the stem 502, and the stem 502 is positioned within the stem guide 504, which is rigidly coupled (e.g., via a press fit) to the bonnet 412. The bonnet 412 is rigidly coupled via suitable fasteners (e.g., bolts or screws) to the valve body 410. In the illustrated example, the fusible link 512 rigidly couples the stem 502 to the stem guide 504 and prevents the stem 502 (and the attached valve plug 402) from translating within the stem guide 504 in a direction away from the bonnet 412 and toward the valve seat 404.

In the illustrated example, the valve plug 402 is also rigidly coupled to the spring seat 506. In the illustrated example, the spring seat 506 is positioned within the spring seat guide 508, which is rigidly coupled via suitable fasteners (e.g., bolts or screws) to the bonnet 412. The closing spring 510 is positioned within the spring seat 506. In the illustrated example, the closing spring 510 applies a force against the spring seat 506, thereby biasing the spring seat 506 and the attached valve plug 402 toward the valve seat 404. More specifically, the closing spring 510 biases the first metallic sealing surface 406 of the valve plug 402 toward the second metallic sealing surface 408 of the valve seat 404. In the illustrated example, the force applied by the closing spring 510 on the spring seat 506 is translated via the spring seat 506, the attached valve plug 402 and the attached stem 502 to the fusible link 512 that rigidly secures the stem 502 to the stem guide 504. The fusible link 512 is configured to be of a shape, rigidity and or hardness so as not to be deformed in response to the force applied by the closing spring 510. Thus, the fusible link 512 maintains the example valve plug 402 in an open and/or spaced apart position relative to the valve seat 404.

Figure 6:
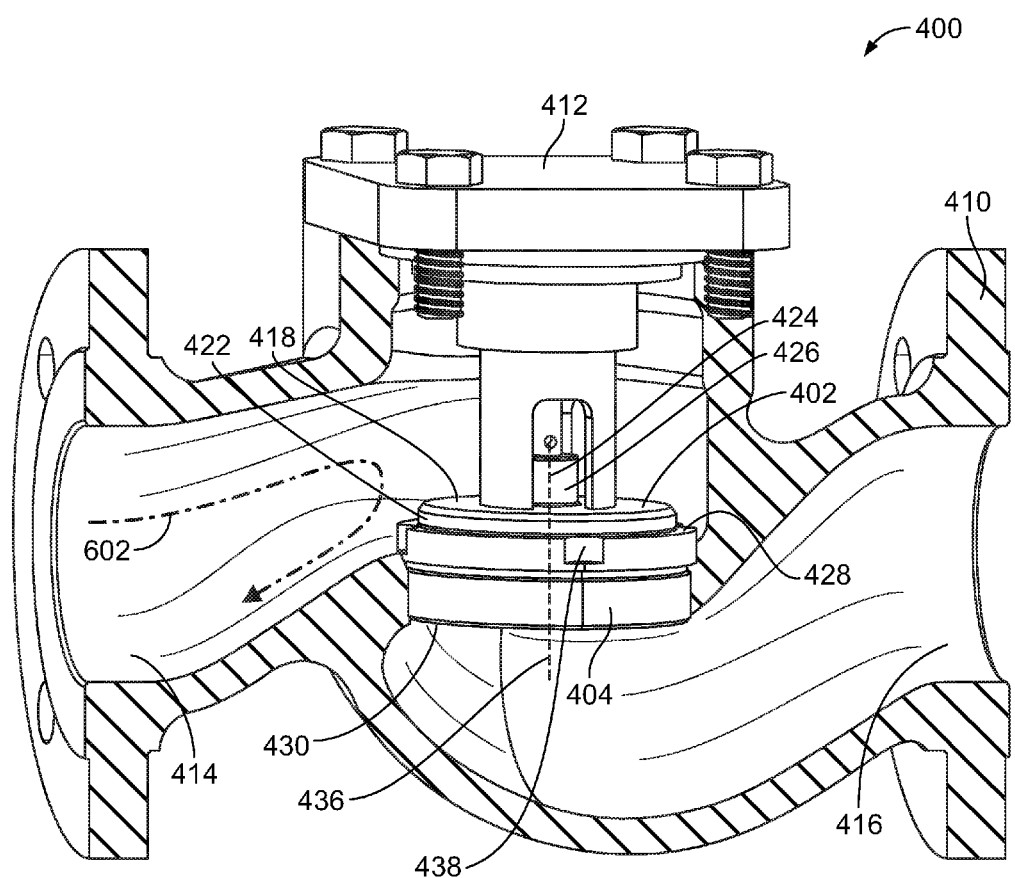
FIG. 6 is a partial cutaway view of the example valve of FIG. 4 in a closed configuration.
Figure 7:
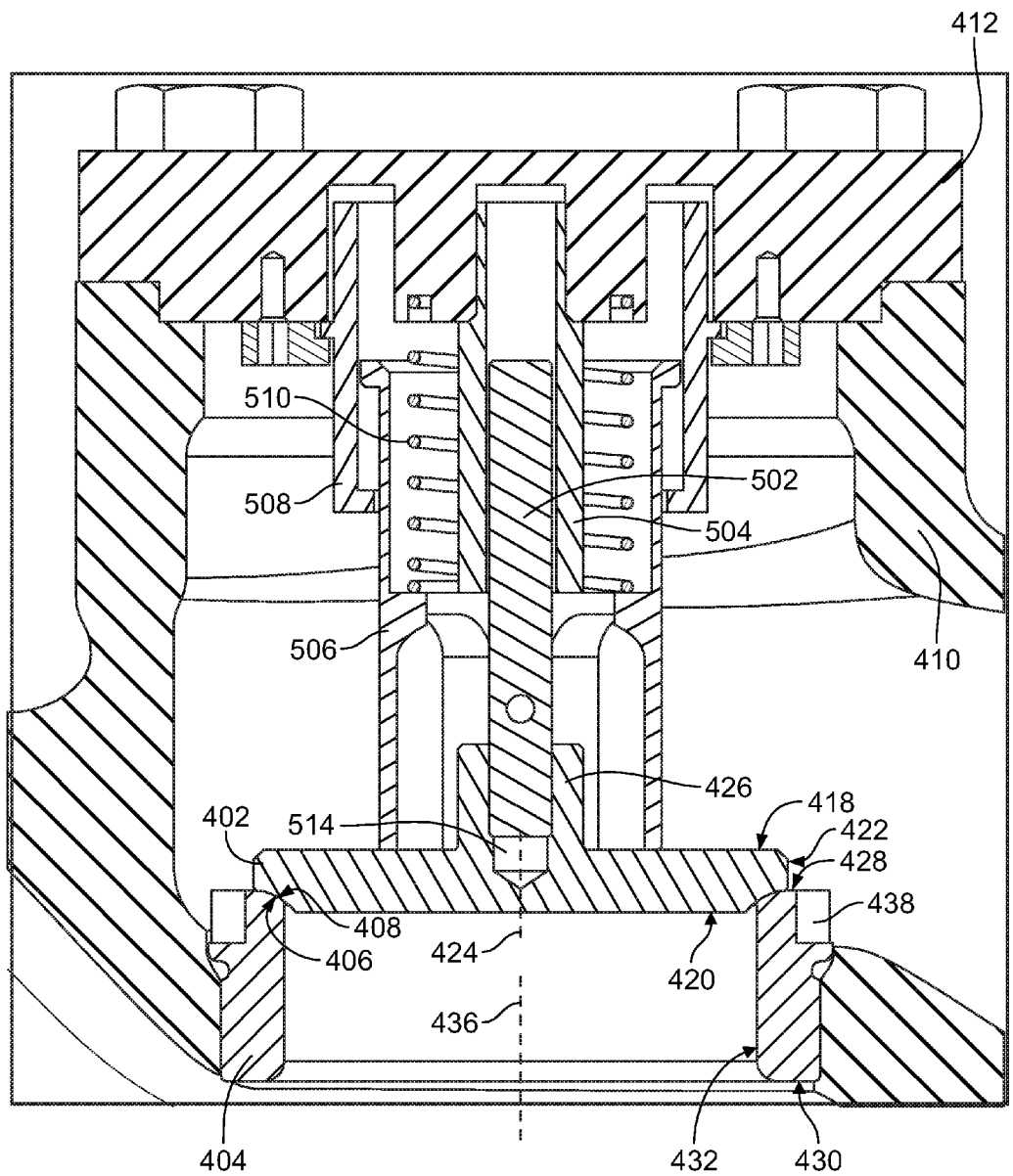
FIG. 7 is another partial cutaway view of the example valve of FIG. 4 in a closed configuration.
Figure 8:
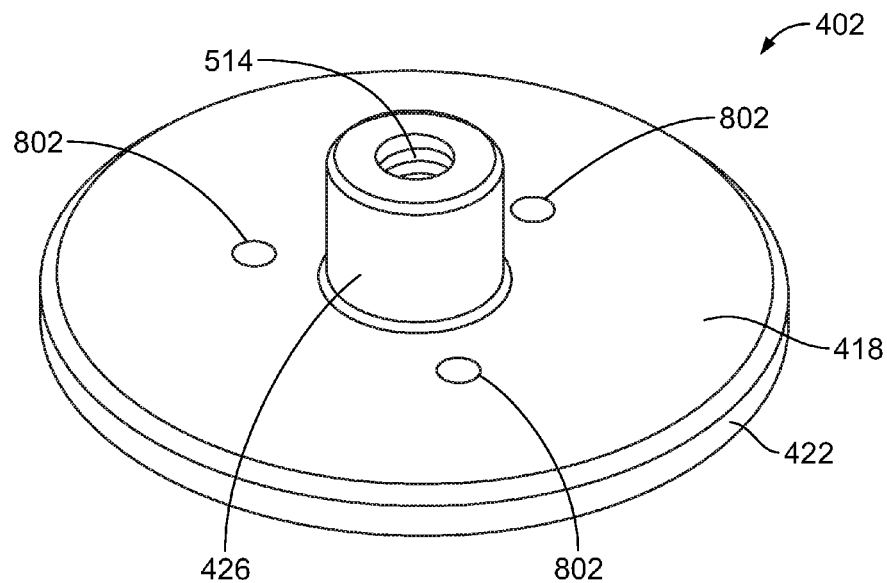
FIG. 8 is a perspective view of the example valve plug shown in FIGS. 4-7.
Figure 9:
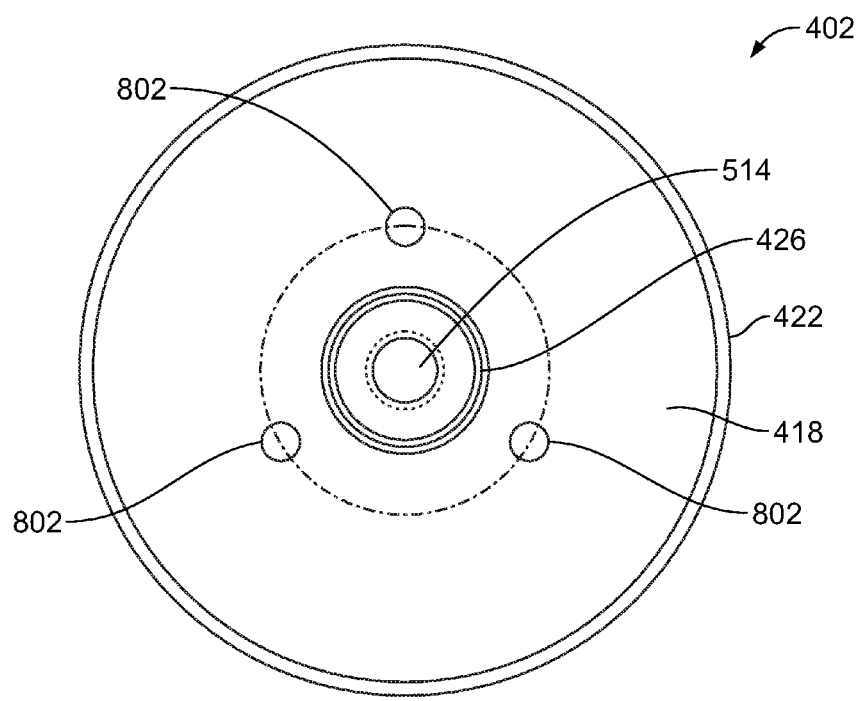
FIG. 9 is a plan view of the example valve plug of FIG. 8.
Figure 10:
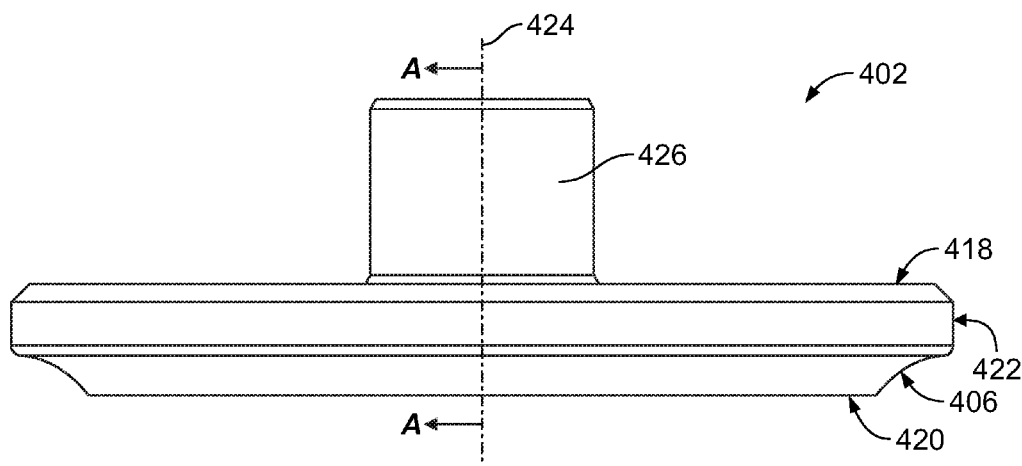
FIG. 10 is a side view of the example valve plug of FIGS. 8-9.
Figure 11:
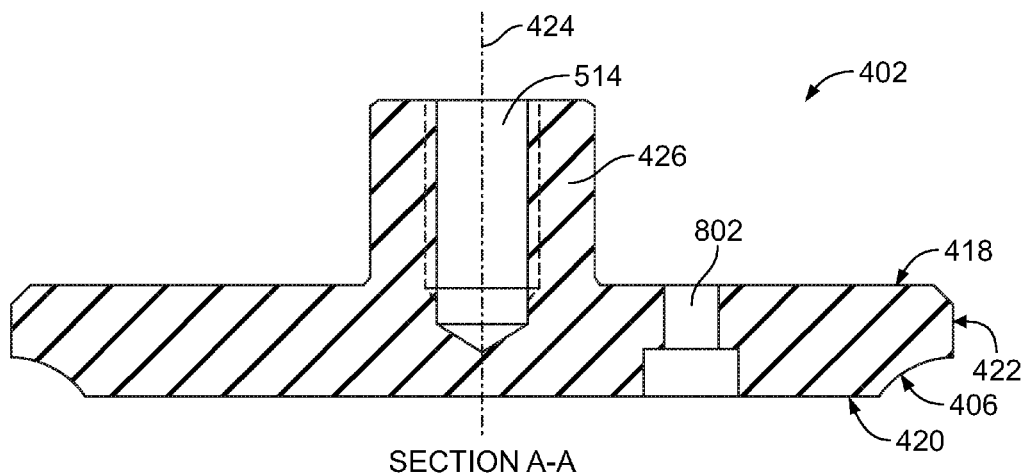
FIG. 11 is a cross-sectional view of the example valve plug of FIGS. 8-10 taken along line A-A of FIG. 10.
Figure 12:
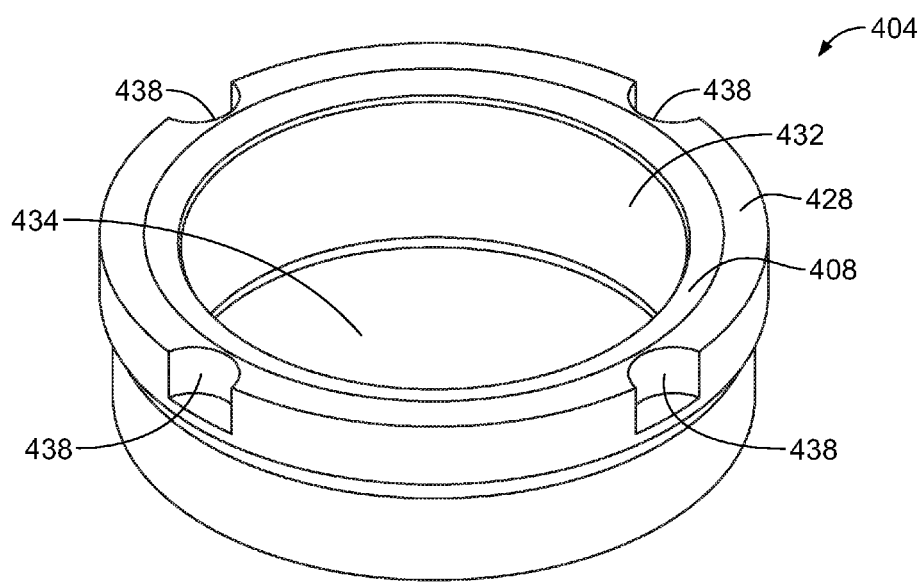
FIG. 12 is a perspective view of the example valve seat shown in FIGS. 4-7.
Figure 13:
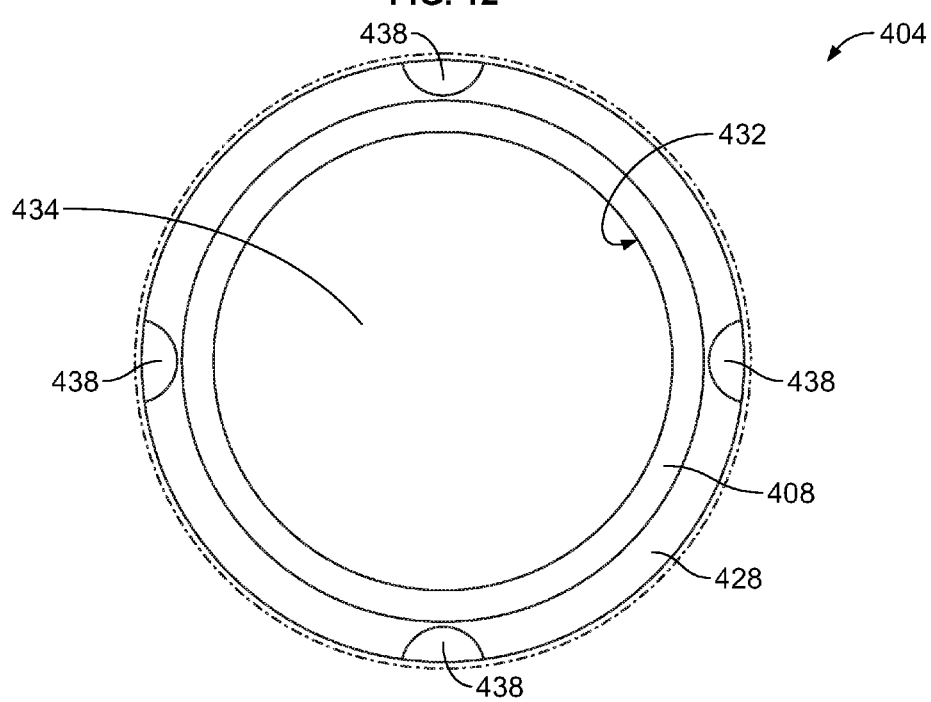
FIG. 13 is a plan view of the example valve seat of FIG. 12.
Figure 14:
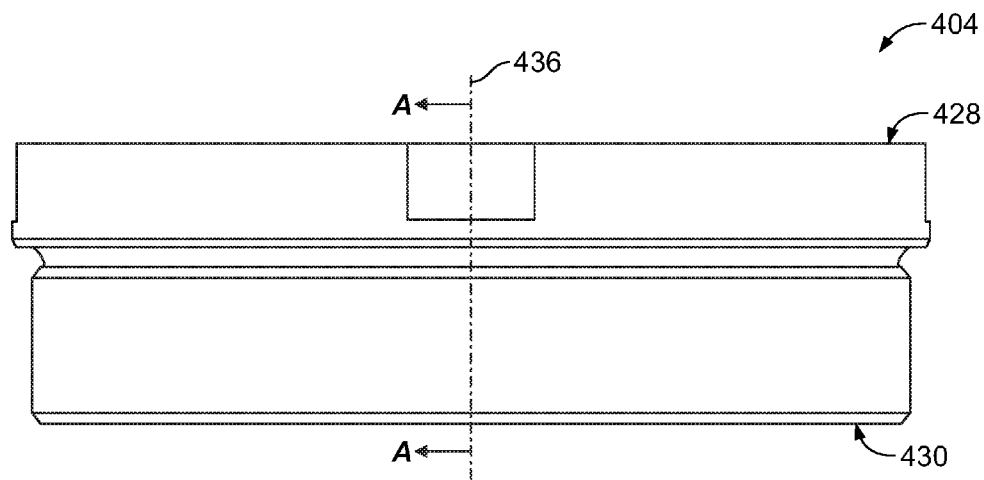
FIG. 14 is a side view of the example valve seat of FIGS. 12-13.
Figure 15:
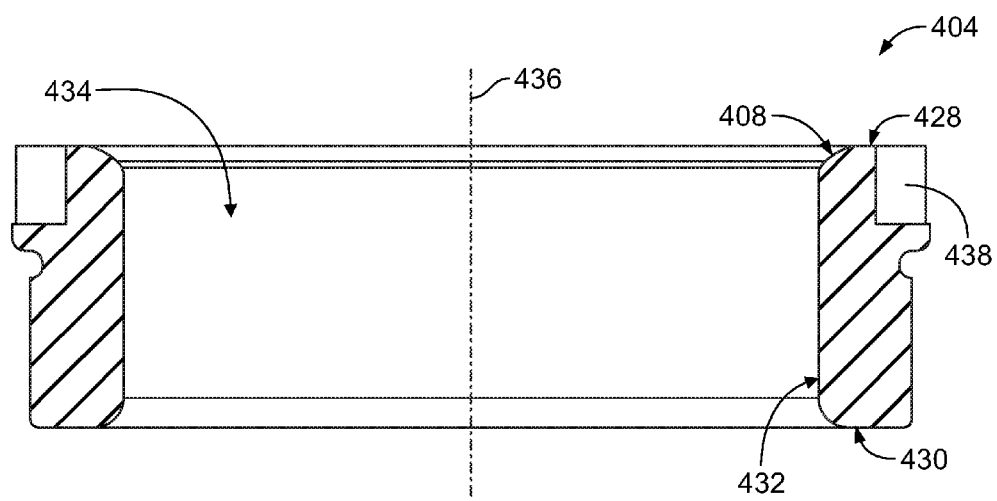
FIG. 15 is a cross-sectional view of the example valve seat of FIGS. 12-14 taken along line A-A of FIG. 14.

Referring to FIGS. 6-7, the example valve 400 of FIGS. 4-5 is shown in a closed configuration. In the illustrated example of FIGS. 6-7, the fusible link 512 (or a substantial portion thereof) that appeared in FIG. 5 has melted away and/or been burned off as a result of exposure to a high temperature (e.g., that which would be caused by a flame) within the valve body 410 of the valve 400. In the absence of the fusible link 512, the force applied by the closing spring 510 against the spring seat 506 causes the spring seat 506 and the attached valve plug 402 to collie into contact with the valve seat 404. More specifically, the closing spring 506 causes the first metallic sealing surface 406 of the valve plug 402 to come into contact with the complementary second metallic sealing surface 408 of the valve seat 404, thereby resulting in a metal-to-metal seal between the first metallic sealing surface 406 of the valve plug 402 and the second metallic sealing surface 408 of the valve seat 404.

As illustrated in FIGS. 6-7, the respective complementary curved profiles of the first and second metallic sealing surfaces 406, 408 cause the first central axis 424 of the valve plug 402 to align with the second central axis 436 of the valve seat 404 when the first and second metallic sealing surfaces 406, 408 are in contact. Thus, the respective complementary curved profiles of the first and second metallic sealing surfaces 406, 408 cause the valve plug 402 to be self-centering relative to the valve seat 404 when the valve plug 402 and the valve seat 404 are in a closed configuration. When the valve 400 is placed into a closed configuration as described above in connection with FIGS. 6-7, the metal-to-metal seal that exists between the first metallic sealing surface 406 of the valve plug 402 and the second metallic sealing surface 408 of the valve seat 404 prevents fluid from traveling along the pathway 440 shown in FIG. 4, and instead restricts the fluid to a location between the fluid inlet 414 and the valve plug 402 and/or the valve seat 404, as is generally shown in FIG. 6 by the illustrated pathway 602.

FIGS. 8-11 illustrate the example valve plug 402 of FIGS. 4-7 in greater detail. As more clearly shown in FIGS. 8-11, the first metallic sealing surface 406 of the valve plug 402 extends circumferentially about the peripheral edge 422 of the valve plug 402. The first metallic sealing surface 406 is adjacent the second surface 420 of the valve plug 402, and is also adjacent the peripheral edge 422 of the valve plug 402. The first curved profile of the metallic sealing surface 406 has a concave parabolic shape. As more clearly shown in FIGS. 8-11, the hub 426 of the valve plug 402 includes the bore 514, which is configured to couple the valve plug 402 to the stem 502 described above in connection with FIGS. 4-7 via, for example, a threaded connection. The valve plug 402 also includes example bores 802 through which the valve plug 402 may be coupled via suitable fasteners (e.g., bolts or screws) to the spring seat 506 described above in connection with FIGS. 4-7.

FIGS. 12-15 illustrate the example valve seat 404 of FIGS. 4-7 in greater detail. As more clearly shown in FIGS. 12-15, the second metallic sealing surface 408 extends circumferentially about the inner surface 432 of the valve seat 404. The second metallic sealing surface 408 is adjacent the first annular surface 428 of the valve seat 404, and is also adjacent the inner surface 432 of the valve seat 404. The second curved profile of the second metallic sealing surface 408 has a convex parabolic shape that is complementary to (e.g., having a radius of curvature that matches and/or is substantially the same as that of) the concave parabolic shape of the first curved profile of the first metallic sealing surface 406. As more clearly shown in FIGS. 12-15, the valve seat 404 includes the recesses 438 located along the first annular surface 428 of the valve seat 404 that may be used to facilitate the installation of the valve seat 404 within the valve body 410 described above in connection with FIGS. 4-7.

The respective complementary curved profiles of the first and second metallic sealing surfaces 406, 408 described above in connection with FIGS. 8-15 cause the first central axis 424 of the valve plug 402 to align with the second central axis 436 of the valve seat 404 when the first and second metallic sealing surfaces 406, 408 are in contact. Thus, the respective complementary curved profiles of the first and second metallic sealing surfaces 406, 408 cause the valve plug 402 to be self-centering relative to the valve seat 404 when the valve plug 402 and the valve seat 404 are in a closed configuration. In some examples, the respective curved profiles of the first and second metallic sealing surfaces 406, 408 may be reversed and/or otherwise modified relative to the valve plug 402 and the valve seat 404 illustrated in FIGS. 8-15. For example, the first metallic sealing surface 406 of the valve plug 402 may have a convex shape that is complementary to a corresponding concave shape of the second metallic sealing surface 408 of the valve seat 404. The first and second metallic sealing surfaces 406, 408 may be of any shape, configuration and/or orientation so long as the first and second sealing surfaces 406, 408 have complementary curved profiles.

Although certain apparatus have been described herein, the scope of coverage of this patent is not limited thereto. On the contrary, this patent covers all apparatus fairly falling within the scope of the appended claims either literally or under the doctrine of equivalents.

What is claimed is:

1. An apparatus, comprising:
   a disc-shaped valve plug including a first surface, a second surface opposite the first surface, a peripheral edge located between the first and second surfaces, a plurality of bores extending between the first and second surfaces, and a first metallic sealing surface extending circumferentially about the peripheral edge, the first metallic sealing surface having a first curved profile;
   a valve seat defining an orifice and including a second metallic sealing surface having a second curved profile, the first and second profiles being complementary so that the first and second metallic sealing surfaces form a seal when the first and second metallic sealing surfaces are in contact; and
   a spring seat, the valve plug to be coupled to the spring seat via a plurality of fasteners, respective ones of the fasteners to be positioned in corresponding respective ones of the bores to couple the valve plug to the spring seat.

2. The apparatus as defined in claim 1, wherein the first and second curved profiles have respective parabolic shapes.

3. The apparatus as defined in claim 1, wherein the first curved profile has a concave shape and the second curved profile has a convex shape.

4. The apparatus as defined in claim 1, wherein the first metallic sealing surface is adjacent the second surface of the valve plug.

5. The apparatus as defined in claim 1, wherein the valve seat includes a first annular surface and a second annular surface opposite the first annular surface, the second metallic sealing surface being adjacent the first annular surface of the valve seat.

6. The apparatus as defined in claim 5, wherein the valve seat includes an inner surface, the inner surface being between the first and second annular surfaces of the valve seat, the second metallic sealing surface being adjacent the inner surface of the valve seat.

7. The apparatus as defined in claim 1, wherein the valve plug has a first central axis defined by the peripheral edge of the valve plug, the valve seat has a second central axis defined by an inner surface of the valve seat, and wherein the first and second metallic sealing surfaces align the first central axis with the second central axis when the first and second metallic sealing surfaces are in contact.

8. The apparatus as defined in claim 1, wherein the first and second metallic sealing surfaces are magnetically coupled when the first and second metallic sealing surfaces are in contact.

9. An apparatus, comprising:
a disc-shaped valve plug including a first surface, a second surface opposite the first surface, a peripheral edge located between the first and second surfaces, a plurality of bores extending between the first and second surfaces, and a first metallic sealing surface extending circumferentially about the peripheral edge, the first metallic sealing surface having a first curved profile;
a valve seat including a second metallic sealing surface extending circumferentially about an inner surface of the valve seat, the inner surface being between a first annular surface of the valve seat and a second annular surface of the valve seat opposite the first annular surface, the inner surface and the first and second annular surfaces defining an orifice, the second metallic sealing surface having a second curved profile complimentary complementary to the first curved profile of the first metallic sealing surface; and
a spring seat, the valve plug to be coupled to the spring seat via a plurality of fasteners, respective ones of the fasteners to be positioned in corresponding respective ones of the bores to couple the valve plug to the spring seat.

10. The apparatus as defined in claim 9, wherein the first and second curved profiles have respective parabolic shapes.

11. The apparatus as defined in claim 9, wherein the first curved profile has a concave shape and the second curved profile has a convex shape.

12. The apparatus as defined in claim 9, wherein the first metallic sealing surface is adjacent the second surface of the valve plug and the second metallic sealing surface is adjacent the first annular surface of the valve seat.

13. The apparatus as defined in claim 9, wherein the first metallic sealing surface is adjacent the second surface of the valve plug and the second metallic sealing surface is adjacent the inner surface of the valve seat.

14. The apparatus as defined in claim 9, wherein the valve plug has a first central axis defined by the peripheral edge of the valve plug, the valve seat has a second central axis defined by the inner surface of the valve seat, and wherein the first and second metallic sealing surfaces align the first central axis with the second central axis when the first and second metallic sealing surfaces are in contact.

15. The apparatus as defined in claim 9, wherein the first and second metallic sealing surfaces are magnetically coupled when the first and second metallic sealing surfaces are in contact.

16. An apparatus, comprising:
a first disc-shaped valve member including a first surface, a second surface opposite the first surface, a peripheral edge located between the first and second surfaces, a plurality of bores extending between the first and second surfaces, and a first sealing means for creating a seal relative to a second sealing means when the first and second sealing means are in contact, the first sealing means having a first curved profile;
a second valve member defining an orifice and including the second sealing means, the second sealing means having a second curved profile complementary to the first curved profile of the first sealing means; and
a spring seat, the first valve member to be coupled to the spring seat via a plurality of fasteners, respective ones of the fasteners to be positioned in corresponding respective ones of the bores to couple the first valve member to the spring seat.

17. The apparatus as defined in claim 16, wherein the first and second curved profiles have respective parabolic shapes.

18. The apparatus as defined in claim 16, wherein the first curved profile has a concave shape and the second curved profile has a convex shape.

19. The apparatus as defined in claim 16, wherein the first valve member has a first central axis defined by the peripheral edge of the first valve member, the second valve member has a second central axis defined by an inner surface of the second valve member, and wherein the first and second sealing means align the first central axis with the second central axis when the first and second sealing means are in contact.

20. The apparatus as defined in claim 16, wherein the first and second sealing means are magnetically coupled when the first and second sealing means are in contact.

21. The apparatus of claim 1, wherein respective ones of the bores are radially spaced about a central axis defined by the peripheral edge.

* * * * *

UNITED STATES PATENT AND TRADEMARK OFFICE
CERTIFICATE OF CORRECTION

PATENT NO.      : 9,732,858 B2                                    Page 1 of 1
APPLICATION NO. : 15/056476
DATED           : August 15, 2017
INVENTOR(S)     : Bowyer et al.

It is certified that error appears in the above-identified patent and that said Letters Patent is hereby corrected as shown below:

In the Claims

Column 9, Lines 50-51 (Claim 9): Replace "profile complimentary complementary" with --profile complementary--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*